United States Patent
Gervais et al.

(10) Patent No.: US 10,070,470 B2
(45) Date of Patent: Sep. 4, 2018

(54) ENVIRONMENT CONTROL DEVICE PROVIDING A WI-FI HOTSPOT FOR ACCESSING THE INTERNET

(71) Applicant: Distech Controls Inc., Brossard (CA)

(72) Inventors: Francois Gervais, Lachine (CA); Danny Breton, Saint-Jean sur Richelieu (CA); Francois Ouellet, Montreal (CA)

(73) Assignee: DISTECH CONTROLS INC., Brossard (CA)

( * ) Notice: Subject to any disclaimer, the term of this patent is extended or adjusted under 35 U.S.C. 154(b) by 121 days.

(21) Appl. No.: 14/845,413

(22) Filed: Sep. 4, 2015

(65) Prior Publication Data

US 2017/0071015 A1 Mar. 9, 2017

(51) Int. Cl.
| | |
|---|---|
| H04W 76/02 | (2009.01) |
| H04W 4/00 | (2018.01) |
| H04L 12/24 | (2006.01) |
| H04W 76/10 | (2018.01) |
| H04W 4/80 | (2018.01) |
| H04W 84/18 | (2009.01) |

(Continued)

(52) U.S. Cl.
CPC ............ *H04W 76/10* (2018.02); *H04L 41/12* (2013.01); *H04W 4/80* (2018.02); *H04W 84/18* (2013.01); *H04Q 2209/43* (2013.01); *H04W 4/70* (2018.02); *H04W 84/12* (2013.01)

(58) Field of Classification Search
CPC ..... H04W 84/12; H04W 84/18; H04W 80/04; H04W 8/26; H04W 88/06
See application file for complete search history.

(56) References Cited

U.S. PATENT DOCUMENTS

| | | | |
|---|---|---|---|
| 6,911,916 B1* | 6/2005 | Wang .................. | A61B 5/7475 340/3.5 |
| 7,711,361 B2* | 5/2010 | Wang ..................... | H04W 8/08 370/328 |

(Continued)

OTHER PUBLICATIONS

Siemens—Industrial Communication—The Wireless Path to Success FAV-367-2013 De http://www.industry.usa.siemens.com/verticals/us/en/food-beverage/carbonated-non-carbonated/Documents/Referenz_Zeppelin_Reimelt_367_13_en.pdf.

(Continued)

*Primary Examiner* — Mark Rinehart
*Assistant Examiner* — Sanjay K Dewan
(74) *Attorney, Agent, or Firm* — RatnerPrestia

(57) ABSTRACT

An environment control device (ECD) providing a Wi-Fi hotspot for accessing the Internet. The ECD comprises a communication module with a Wi-Fi hotspot functionality for establishing a Wi-Fi hotspot at the ECD, and a mesh client functionality for communicating over a mesh network. The communication module provides for exchanging environmental data with at least another ECD, over one of the Wi-Fi hotspot or mesh network. It also provides for receiving upstream Internet data from at least one user terminal over the Wi-Fi hotspot, and forwarding the upstream Internet data to another ECD over the mesh network. It further provides for receiving downstream Internet data from another ECD over the mesh network, and forwarding the downstream Internet data to the at least one user terminal over the Wi-Fi hotspot. The ECD providing the Wi-Fi hotspot for accessing the Internet may be a daisy-chained ECD controlled by a master ECD.

14 Claims, 6 Drawing Sheets

(51) Int. Cl.
*H04W 4/70* (2018.01)
*H04W 84/12* (2009.01)

(56) References Cited

U.S. PATENT DOCUMENTS

| | | | | |
|---|---|---|---|---|
| 8,145,357 B2* | 3/2012 | Nibler | ............... | G05B 15/02 340/505 |
| 8,457,797 B2* | 6/2013 | Imes | ............... | H04L 67/42 370/338 |
| 8,477,687 B2* | 7/2013 | Iwasa | ............... | H04L 45/72 370/227 |
| 8,570,993 B2* | 10/2013 | Austin | ............... | H04W 4/02 370/338 |
| 9,253,589 B2* | 2/2016 | McCann | ............... | H04W 4/008 |
| 2004/0215766 A1* | 10/2004 | Haddad | ............... | H04L 47/11 709/224 |
| 2005/0232179 A1* | 10/2005 | daCosta | ............... | H04W 84/00 370/315 |
| 2007/0242688 A1* | 10/2007 | McFarland | ............... | H04L 12/2803 370/445 |
| 2008/0225989 A1* | 9/2008 | An | ............... | G06F 7/68 375/326 |
| 2009/0066587 A1* | 3/2009 | Hayes | ............... | H01Q 1/2275 343/702 |
| 2010/0118750 A1* | 5/2010 | Iwasa | ............... | H04W 40/24 370/310 |
| 2010/0208621 A1* | 8/2010 | Morper | ............... | H04L 41/0853 370/255 |
| 2012/0109404 A1* | 5/2012 | Pandey | ............... | G05D 23/00 700/299 |
| 2012/0166695 A1* | 6/2012 | Venus | ............... | G06F 13/4256 710/110 |
| 2012/0221150 A1 | 8/2012 | Arensmeier | | |
| 2013/0085616 A1* | 4/2013 | Wenzel | ............... | G05F 1/66 700/278 |
| 2013/0184876 A1* | 7/2013 | Roshen | ............... | G06F 1/3231 700/277 |
| 2014/0003286 A1* | 1/2014 | Estevez | ............... | H04W 84/18 370/254 |
| 2014/0029172 A1* | 1/2014 | Yoo | ............... | H02J 1/00 361/679.01 |
| 2014/0064181 A1* | 3/2014 | Srivastava | ............... | H04W 84/18 370/328 |
| 2014/0248033 A1* | 9/2014 | Hung | ............... | G11B 31/00 386/234 |
| 2014/0362729 A1 | 12/2014 | Michaud et al. | | |
| 2015/0043425 A1 | 2/2015 | Aggarwal et al. | | |
| 2015/0098357 A1 | 4/2015 | Lupien et al. | | |
| 2015/0276237 A1* | 10/2015 | Daniels | ............... | F24D 19/10 237/2 A |
| 2016/0127173 A1 | 5/2016 | Gagnon et al. | | |
| 2016/0128015 A1* | 5/2016 | McCann | ............... | H04W 4/008 370/338 |

OTHER PUBLICATIONS

Shah et al., "Load Peservation Systems Real-time cogeneration source protection of critical utility loads", IEEE Industry Applications Magazine, Sep. 2007, vol. 13, No. 5, pp. 31-37, 7 pages.
Akyildiz et al., "A Survey on Wireless Mesh Networks", IEEE Radio Communications, Sep. 2005, vol. 43, No. 9, pp. S23-S30, 8 pages.
Starsinic, "System Architecture Challenges in the Home M2M Network", Applications and Technology Conference, May 7, 2010, pp. 1-7, 6 pages.
Zhang et al., "An Efficient MAC Layer Handoff Scheme for WiFi-based Multichannel Wireless Mesh Networks", Communications, 2009, IEEE International Conference, Jun. 14, 2009, pp. 1-5, 5 pages.
European Search Report issued in Application No. EP 16 18 6751, dated Jan. 26, 2017, pp. 24-27, 4 pages.

* cited by examiner

ENVIRONMENT CONTROL DEVICE PROVIDING A WI-FI HOTSPOT FOR ACCESSING THE INTERNET

TECHNICAL FIELD

The present disclosure relates to the field of environment control systems. More specifically, the present disclosure relates to an environment control device providing a Wi-Fi hotspot for accessing the Internet.

BACKGROUND

Systems for controlling environmental conditions, for example in buildings, are becoming increasingly sophisticated. An environment control system may at once control heating and cooling, monitor air quality, detect hazardous conditions such as fire, carbon monoxide release, intrusion, and the like. Such environment control systems generally include at least one environment controller, which receives measured environmental values, generally from external sensors, and in turn determines set-points or command parameters to be sent to controlled appliances. The various components (e.g. controllers, sensors, controlled appliances) of an environment control system are generally referred to as environment control devices (EGDs).

Communications between an environment controller and the devices under its control (sensors, controlled appliances), or between multiple environment controllers, are based on wires in legacy environment control systems. The wires are deployed in the building where the environment control system is operating, for instance in the walls, ceilings, and floors of multiple rooms in the building.

For facilitating the deployment of a communication infrastructure between components of an environment control system, wireless communication technologies (e.g. Wi-Fi) are more and more frequently used instead of/complementarily to wires, for installing new environment control systems or upgrading existing environment control systems. Consequently, a building may end up with a duplicate wireless communication infrastructure: one dedicated to an environment control system for exchanging environmental data, and one dedicated to residents of the building for accessing the Internet. However, it would be more efficient to leverage the wireless communication infrastructure of the environment control system for providing Internet access to the residents of the building, at least at locations in the building where the environment control system is deployed.

Therefore, there is a need for environment control devices providing a Wi-Fi hotspot for accessing the Internet. Furthermore, there is a need of adapting environment control devices used in a daisy-chained communication configuration (which is a common configuration in the context of environment control systems) to provide a Wi-Fi hotspot for accessing the Internet.

SUMMARY

In accordance with a first aspect, the present disclosure relates to an environment control device (ECD). The ECD comprises a communication module, which includes a Wi-Fi hotspot functionality and a mesh client functionality. The Wi-Fi hotspot functionality establishes a Wi-Fi hotspot at the ECD. The mesh client functionality allows communications over a mesh network. The communication module provides for exchanging environmental data with at least another ECD, over one of the Wi-Fi hotspot or the mesh network. The communication module also provides for receiving upstream Internet data from at least one user terminal over the Wi-Fi hotspot, and forwarding the upstream Internet data to another ECD over the mesh network. The communication module further provides for receiving downstream Internet data from another ECD over the mesh network, and forwarding the downstream Internet data to the at least one user terminal over the Wi-Fi hotspot.

In accordance with a second aspect, the present disclosure relates to an environment control device (ECD) for use in a daisy-chained communication configuration. The ECD comprises an input for receiving an input signal having an input frequency from a preceding device in the daisy-chained communication configuration. The ECD comprises a specialized electronic circuit for generating an output signal having an output frequency different and based on the input frequency. The ECD comprises an output for outputting the output signal to a following device in the daisy-chained communication configuration. The ECD comprises a processing unit for determining an address of the ECD based on the input frequency of the input signal. The ECD comprises a communication module, which includes a Wi-Fi hotspot functionality and a daisy-chain communication functionality. The Wi-Fi hotspot functionality establishes a Wi-Fi hotspot at the ECD. The daisy-chain communication functionality allows communications over a daisy-chain network using the determined address. The communication module provides for exchanging environmental data with at least another ECD over one of the Wi-Fi hotspot or the daisy-chain network. The communication module also provides for receiving upstream Internet data from at least one user terminal over the Wi-Fi hotspot, and forwarding the upstream Internet data to another ECD over the daisy-chain network. The communication module further provides for receiving downstream Internet data from another ECD over the daisy-chain network, and forwarding the downstream Internet data to the at least one user terminal over the Wi-Fi hotspot.

In accordance with a third aspect, the present disclosure relates to a master device for use in a daisy-chained communication configuration. The master device comprises memory for storing for each device of the daisy-chained communication configuration an address of the device and characteristics of the device. The master device comprises an output for transmitting a signal having a pre-determined frequency to a first device in the daisy-chained communication configuration. The master device comprises a communication interface for exchanging environmental data and Internet data with devices of the daisy-chained communication configuration using the addresses of the devices stored in the memory. The master device further comprises a processing unit. The processing unit generates the environmental data transmitted to a device of the daisy-chained communication configuration via the communication interface. The generated data depend on the characteristics of the device stored in the memory. The processing unit processes the environmental data received from a device of the daisy-chained communication configuration via the configuration interface. The processing depends on the characteristics of the device stored in the memory. The processing unit forwards upstream Internet data received from a device of the daisy-chained communication configuration to an Internet gateway. The processing unit forwards downstream Internet data received from the Internet gateway to a device of the daisy-chained communication configuration.

BRIEF DESCRIPTION OF THE DRAWINGS

Embodiments of the disclosure will be described by way of example only with reference to the accompanying drawings, in which.

DETAILED DESCRIPTION

Figure 1:
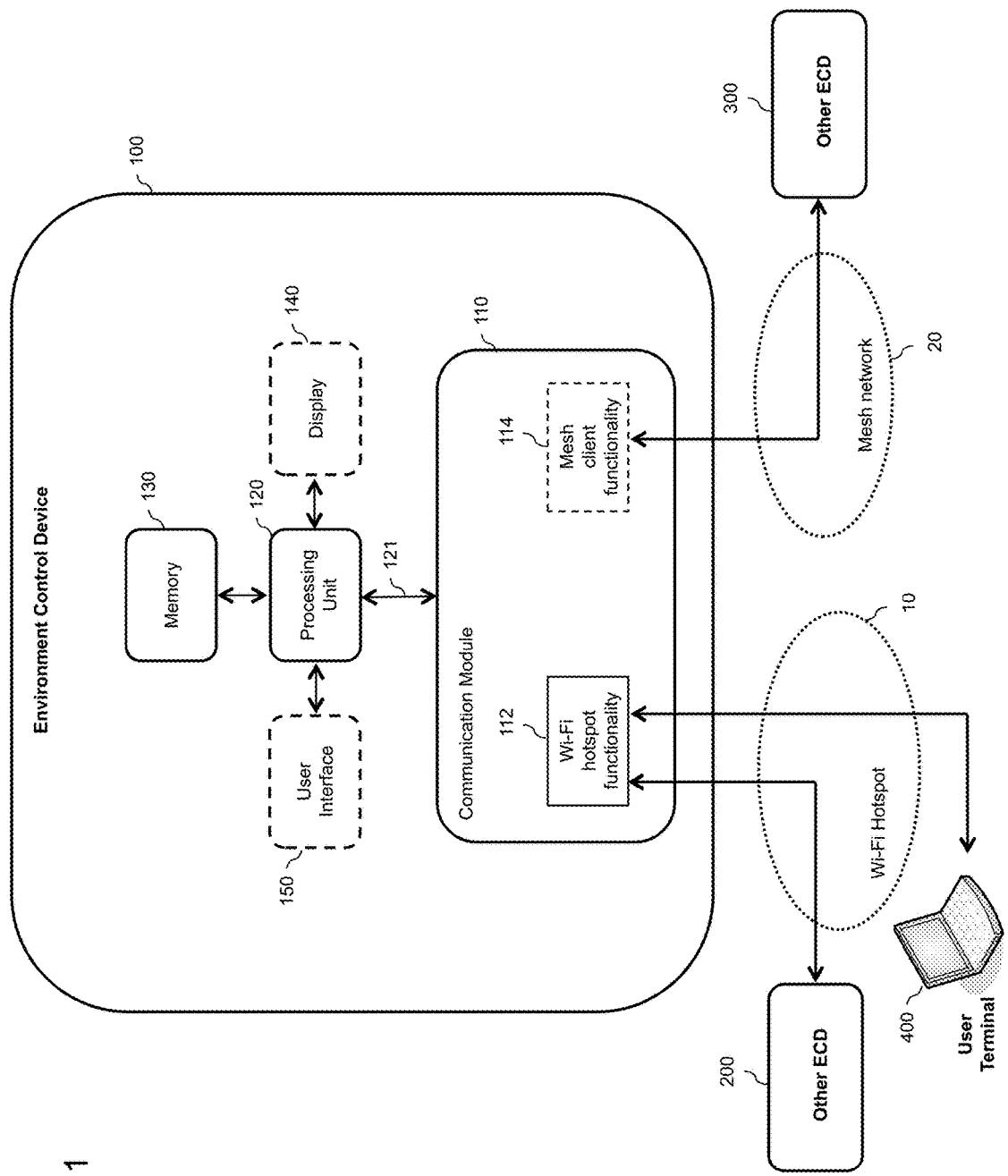
FIG. 1 illustrates an environment control device (ECD) with a communication module including a Wi-Fi hotspot functionality and a mesh client functionality.

The foregoing and other features will become more apparent upon reading of the following non-restrictive description of illustrative embodiments thereof, given by way of example only with reference to the accompanying drawings. Like numerals represent like features on the various drawings.

Various aspects of the present disclosure generally address one or more of the problems related to the provision of Wi-Fi hotspots for accessing the Internet by environment control devices of an environment control system.

Terminology

The following terminology is used throughout the present disclosure:

Environment: condition(s) (temperature, pressure, oxygen level, light level, security, etc.) prevailing in a controlled area or place, such as for example in a building.

Environment control system: a set of components which collaborate for monitoring and controlling an environment.

Environmental data: any data (e.g. information, commands) related to an environment that may be exchanged between components of an environment control system.

Environment control device (ECD): generic name for a component of an environment control system. An ECD may consist of an environment controller, a sensor, a controlled appliance, etc.

Environment controller: device capable of receiving information related to an environment and sending commands based on such information.

Environmental characteristic: measurable, quantifiable or verifiable property of an environment.

Environmental characteristic value: numerical, qualitative or verifiable representation of an environmental characteristic.

Sensor: device that detects an environmental characteristic and provides a numerical, quantitative or verifiable representation thereof. The numerical, quantitative or verifiable representation may be sent to an environment controller.

Controlled appliance: device that receives a command and executes the command. The command may be received from an environment controller.

Processing unit: processor(s), computer, or like device or component capable of executing mathematical or logical operations and execute code.

Environmental state: a current condition of an environment based on an environmental characteristic, each environmental state may comprise a range of values or verifiable representation for the corresponding environmental characteristic.

Communication module: device or component capable of providing communication functionalities based on a specific communication technology (for example a standardized or proprietary wired communication technology, or a standardized or proprietary wireless communication technology). A specific protocol or set of protocols corresponding to the specific communication technology is implemented by the communication module. The communication module may support several communication technologies simultaneously (e.g. wired and wireless, two different wireless technologies, etc.).

Wireless Fidelity (Wi-Fi®): any Wireless Local Area Network (WLAN) product that is based on the Institute of Electrical and Electronics Engineers' (IEEE) 802.11 standards.

Wi-Fi hotspot: communication infrastructure allowing communications between devices using communication protocols based on the 802.11 standards. The hotspot is established by a dedicated device (e.g. a Wi-Fi Access Point). A device needs to associate with the Wi-Fi hotspot, before being capable of using it for communications with other devices. The dedicated device establishing the Wi-Fi hotspot is associated by default.

Mesh network: communication infrastructure in which each participating node relays data for the network. Each node cooperates in the distribution of data in the network and there is usually more than one path for transmitting data from a source node to a destination node (thus providing greater reliability and flexibility). In the present disclosure, the term mesh network refers to a wireless mesh network, based on a wireless mesh protocol such as IEEE 802.11s.

Environment Control Device

Referring now to FIG. 1, a general schematic representation of components of an ECD 100 having capabilities of establishing a Wi-Fi hotspot 10, as well as communicating over a mesh network 20 is illustrated.

The ECD 100 comprises a communication module 110. The communication module 110 comprises a Wi-Fi hotspot functionality 112 and a mesh client functionality 114. The Wi-Fi hotspot functionality 112 allows the ECD 100 to establish the Wi-Fi hotspot 10. The Wi-Fi hotspot functionality 112 further allows the ECD 100 to exchange environmental data (e.g. information, commands, etc.) with at least one other ECD 200 over the Wi-Fi hotspot 10, as well as to exchange Internet data with at least one user terminal 400 over the Wi-Fi hotspot 10. The mesh client functionality 114 allows the ECD 100 to exchange environmental data with at least one other ECD 300 over the mesh network 20, as well as to exchange Internet data with at least one other ECD 300 over the mesh network 20. The environmental data and the Internet data may be exchanged with the same ECD 300, or with different ECDs 300, over the mesh network 20.

Thus, the communication module 110 of the ECD 100 provides the standard capability of exchanging environmental data with at least another ECD (e.g. 200 and/or 300), over the Wi-Fi hotspot 10 and/or the mesh network 20. The ECD 100 the additional capability of providing Internet access for user terminal(s) 400 connected to the Wi-Fi hotspot 10. For this purpose, the communication module 110 receives upstream Internet data from a user terminal 400 over the Wi-Fi hotspot 10 and forwards the upstream Internet data to another ECD 300 over the mesh network 20. The communication module 110 also receives downstream Internet data from another ECD 300 over the mesh network 20 and forwards the downstream Internet data to the user terminal 400 over the Wi-Fi hotspot 10. Although a single user terminal 400 is represented in FIG. 1 for simplification purposes, the Wi-Fi hotspot 10 may provide Internet access to a plurality of user terminals 400.

The ECD 100 also comprises a processing unit 120 capable of executing instructions of computer program(s) for implementing the functionalities of the ECD 100. For instance, the processing unit 120 receives environmental data (e.g. information or commands) from another ECD (e.g. 200 via the Wi-Fi hotspot 10 or 300 via the mesh network 20) through the communication module 110. The processing unit 120 processes the received environmental data, to generate new environmental data to be transmitted to another ECD. Alternatively or complementarily, the processing unit 120 simply forwards the received environmental data to another ECD. This functionality will be further detailed later in the description, in relation to FIG. 2.

The processing unit 120 also acts as an Internet bridge for the Internet data received and transmitted by the user terminal(s) 400 via the Wi-Fi hotspot 10. Alternatively, the Internet bridge functionality may be directly implemented by the communication module 110. The Internet bridge functionality will be further detailed later in the description, in relation to FIG. 2.

From an implementation perspective, the processing unit 120 and the communication module 110 are generally two independent components of the ECD 100. They communicate via dedicated means, such as an internal communication bus 121. Thus, environmental data received by the communication module 110 are transmitted to the processing unit 120 via the internal communication bus 121, for further processing. Similarly, environmental data generated/processed by the processing unit 120 are transmitted to the communication module 110 via the internal communication bus 121, for further transmission.

The ECD 100 also comprises memory 130. The memory 130 stores the instructions of the computer program(s) executed by the processing unit 120. The memory 130 may also store environmental data received from other ECDs via the communication module 110. Alternatively or complementarily, the memory 130 also stores data resulting from the processing (by the processing unit 120) of the received environmental data. Although the memory 130 is shown as a single box in FIG. 1, those skilled in the art will understand that the memory 130 may consist of a single memory unit, or of a plurality of independent memory units. The memory 130 may comprise several types of memory, including volatile memory (such as a volatile Random Access Memory (RAM)), non-volatile memory (such as a hard drive), etc.

The ECD 300 may also comprise a display 340. The display 340 may display environmental data received via the wireless communication infrastructure 318, or data which result from the processing (by the processing unit 320) of environmental data received via the wireless communication infrastructure 318. Alternatively, the display 340 may display the status of all other devices 400 with which the environment control device 300 is in communication.

The ECD 300 may also comprise a user interface 350. For example, the user interface 350 may be used to receive inputs from a user, with respect to environmental data which are then further transmitted via the wireless communication infrastructure 318 to the other device 400. The user interface 350 could be implemented by means of a touchscreen display.

Communication Module

The Wi-Fi hotspot functionality 112 of the communication module 110 allows the ECD 100 to establish the Wi-Fi hotspot 10, as known in the art and specified by appropriate industry standards. Once the Wi-Fi hotspot 10 is established, another device (e.g. the other ECD 200 or the user terminal 400) having a Wi-Fi client functionality can associate therewith, and further exchange data over the Wi-Fi hotspot 10 with the ECD 100. The ECD 100 also uses its Wi-Fi hotspot functionality 112 to exchange data over the Wi-Fi hotspot 10 with any device associated therewith.

The association procedure is performed as known in the art. The Wi-Fi hotspot functionality 112 may be pre-configured with the proper parameters (e.g. Service Set Identifier (SSID), password, key, etc.). The other devices may have the parameters needed to associate with the Wi-Fi hotspot 10 pre-configured as well. Alternatively, a user may configure the other devices for the association, for example in the case where several different hotspots are available. Technologies like Quick Response (QR) codes or Near Field Communication (NFC) may also be used to automate the configuration process.

Figure 2:
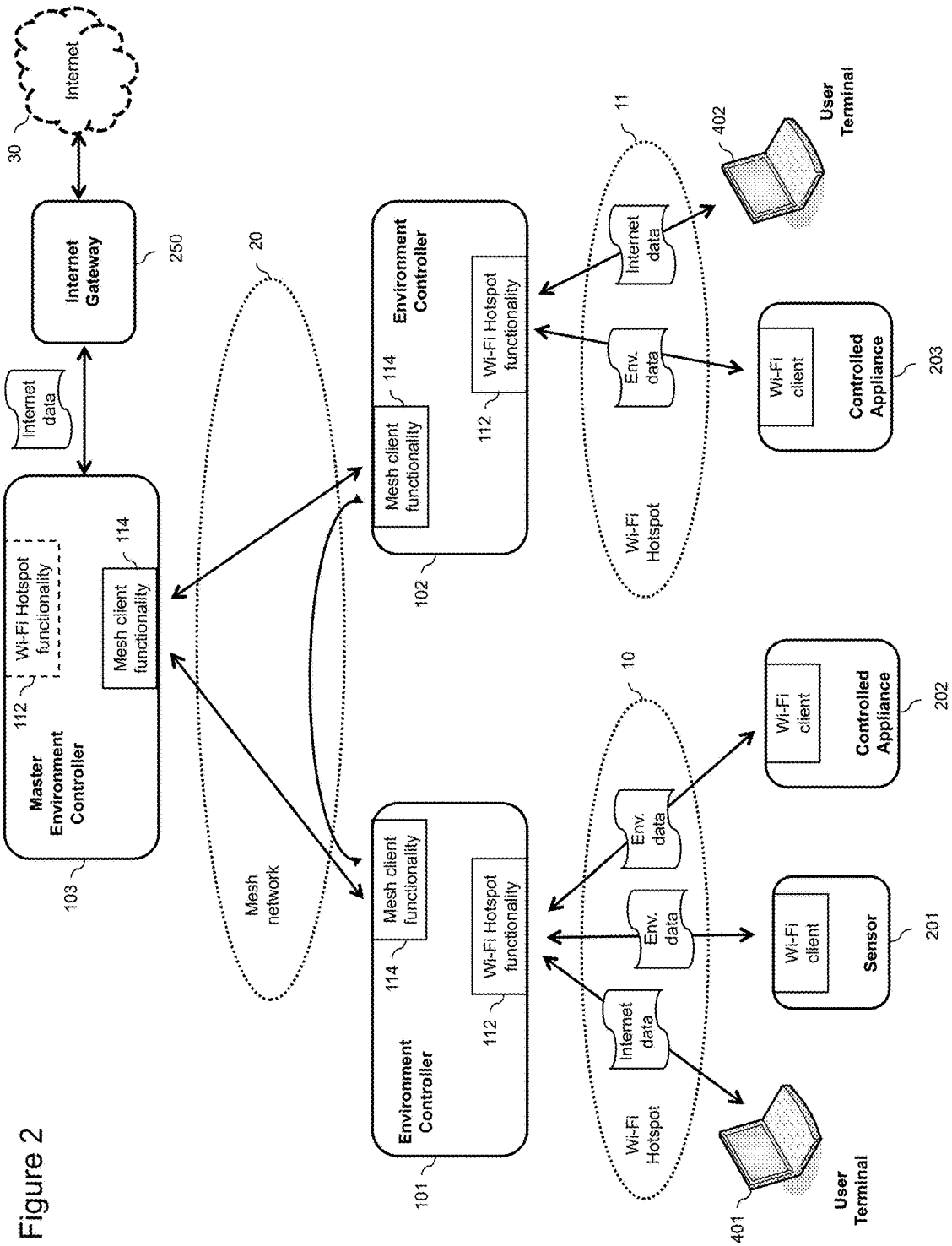
FIG. 2 illustrates an environment control system comprising several of the ECDs represented in FIG. 1.

The ECD 100 also implements IP networking functionalities well known in the art for providing IP networking services to the other devices (e.g. the other ECD 200 or the user terminal 400) associated with the Wi-Fi hotspot 10. The IP networking functionalities may be implemented by the communication module 110 or by the processing unit 120, or by a combination of the two. The IP networking functionalities include for example a Dynamic Host Configuration Protocol (DHCP) relay functionality for allocating IP addresses to the other devices (e.g. 200 or 400) associated with the Wi-Fi hotspot 10. The IP networking functionalities may also include a Network Address Translation (NAT) functionality for using local IPv4 addresses for the other devices (e.g. 200 or 400) associated with the Wi-Fi hotspot 10. The IPv6 protocol may be used, to avoid the use of a NAT. The IP networking functionalities may also include layer 2 and/or layer 3 routing functionalities, for routing IP data packets between the Wi-Fi hotspot 10, the mesh network 20, and other networks located beyond the mesh network 20 (such as the Internet 30 as illustrated in FIG. 2).

The mesh client functionality 114 of the communication module 110 allows the ECD 100 to communicate over the mesh network 20 with another ECD 300 having its own mesh client functionality. The exchange of data between nodes (e.g. 100 and 300) over the mesh network 20 is performed in any manner known in the art of mesh networking. In particular, the ECD 100 may advertise its presence on the mesh network 20 to discover other ECDs connected to the mesh network 20. The ECD 100 may also communicate over the mesh network 20 with devices different from an ECD, as long as these devices include their own mesh client functionality.

The Wi-Fi hotspot functionality 112 and the mesh client functionality 114 may be associated with different virtual ports. An application software executed by the processing unit 120 uses a specific virtual port associated with one of the functionalities (112 or 114) for exchanging data with another device (respectively 200/400 or 300) via this specific functionality (112 or 114). These virtual ports provide an abstraction layer for the application software executed by the processing unit 120. The application software interfaces with the wireless communication infrastructure supported by the ECD 100 as a whole; and is not aware of the underlying Wi-Fi hotspot 10 and mesh network 20. The usage of the appropriate specific virtual port for communicating with a specific other device (respectively 200/400 or 300) is determined by a communication software layer that may be executed by the processing unit 120 or the communication module 110.

The functionalities 112 and 114 of the communication module 110 generally consist of a combination of hardware components and software executed by these hardware components. FIG. 1 represents the communication module 110 being integrated with the ECD 100 as an internal component. The ECD 100 may be designed to natively support the capability to communicate with other devices via the functionalities (112 and 114) of the communication module 110. Alternatively, the hardware and/or software of ECD 100 may be upgraded to provide at least one of the functionalities (112 or 314) of the communication module 110.

In a particular aspect, the communication module 110 of the ECD 100 is provided via a USB key. Such an implementation may be used for a legacy ECD 100, originally using a wired communication module to communicate with other devices, and which cannot be upgraded with an additional communication module 110 internally integrated within the ECD 100. In this particular implementation of the communication module 110, the legacy ECD 100 comprises a native USB controller (not represented in FIG. 1), or is upgraded to integrate the USB controller. Thus, the legacy ECD 100 acquires the capability of communicating with other devices (respectively 200/400 or 300) via one of the Wi-Fi hotspot 10 or the mesh network 20, using the communication module 110 implemented through the USB key when inserted in the USB controller of the ECD 100. Additionally, a software upgrade of the legacy ECD 100 may be needed. The software upgrade consists in providing the capability to the processing unit 120 to use and control the communication module 110 implemented on the USB key.

Alternatively, the ECD 100 may comprise an integrated communication module 110 providing only one of the Wi-Fi hotspot functionality 112 or the mesh client functionality 114. The missing functionality can be provided via a communication module implemented through a USB key inserted in an USB controller of the ECD 100.

In another particular aspect, the communication module 110 of the ECD 100 provides an additional communication functionality. For instance, the communication module 110 also comprises a Bluetooth functionality for exchanging environmental data with at least another ECD via the Bluetooth functionality. The other ECD needs to implement its own Bluetooth functionality for communicating with the ECD 100 via the Bluetooth protocol. In a particular embodiment, the Bluetooth Low Energy (BLE) protocol is used for this purpose.

Wi-Fi Hotspot Functionality

The Wi-Fi hotspot functionality 112 is well known in the art and complies with existing 802.11 standards.

The establishment of the Wi-Fi hotspot 10 by the Wi-Fi hotspot functionality 112 consists for example in establishing an 802.11 Access Point operating in infrastructure mode.

Once the Wi-Fi hotspot 10 is established by the Wi-Fi hotspot functionality 112, a beacon frame is broadcasted. A Wi-Fi client functionality of a device (e.g. 200 or 400) is capable of receiving and interpreting the beacon frame, and thus detecting the presence of the Wi-Fi hotspot 10. The beacon frame comprises capability information related to the Wi-Fi hotspot 10, which are used by the Wi-Fi client to perform the association with the Wi-Fi hotspot 10. Instead of using the beacon frame mechanism, the Wi-Fi client may send a probe request message and receive a probe response message from the Wi-Fi hotspot functionality 112, containing the capability information.

The association with the Wi-Fi hotspot 10 is preceded by an authentication phase, during which authentication frames are exchanged between the Wi-Fi client and the Wi-Fi hotspot functionality 112. In general, the client authenticates itself to the Wi-Fi hotspot 10, but the Wi-Fi hotspot 10 may also have to authenticate itself to the client. The authentication phase may be absent, although it is not recommended for security reasons. During the authentication phase, security material (including for example keys and certificates) are exchanged, which are further used to encrypt all the communications between the Wi-Fi client and the Wi-Fi hotspot functionality 112. Multiple authentication and security protocols are supported by the 802.11 standards, for example Wi-Fi Protected Access (WPA) and WPA2.

Once the authentication phase is successfully completed, an association request frame is sent by the Wi-Fi client to the Wi-Fi hotspot functionality 112, and an association response frame is sent by the Wi-Fi hotspot functionality 112 to the Wi-Fi client. Then, the Wi-Fi client is successfully associated with the Wi-Fi hotspot 10, and can transmit and receive data over the Wi-Fi hotpot 10.

Mesh Client Functionality

The mesh client functionality 114 is well known in the art and complies with existing mesh networking standards.

In a particular aspect, the mesh client functionality 114 implements the 802.11s standard for communicating over the mesh network 20. This may simplify the implementation of the communication module 110, since its Wi-Fi hotspot 112 and mesh client 114 functionalities are then based on a common root standard: 802.11.

The mesh network 20 is a self-organizing network, where each participating ECD (e.g. 100 and 300) has a mesh client providing the capability to communicate in a peer-to-peer manner with other ECDs having a mesh client. Data may be exchanged directly between two ECDs through a direct communication between their respective mesh clients. Alternatively, one or several ECDs (not represented in FIG. 1) may be used as a relay to transmit data from a source ECD (e.g. 100) to a destination ECD (e.g. 300), via a hop by hop communication between their respective mesh clients. This illustrates the flexibility offered by a mesh network: the communication path between two ECDs does not depend on a single point of failure and can be adapted in real time to the operating conditions of the various ECDs participating in the mesh network 20.

Environment Control System

Referring now concurrently to FIGS. 1 and 2, an environment control system comprising a plurality of ECDs similar to those illustrated in FIG. 1 is represented in FIG. 2. This environment control system may be deployed in a controlled area such as a building (not represented in FIG. 2), or a portion of a building such as one or more floors of the building.

For illustration purposes, the environment control system comprises two environment controllers 101 and 102 corresponding to the ECD 100 represented in FIG. 1. However, any number of ECDs 100 represented in FIG. 1 may be integrated to the environment control system of FIG. 2.

Each of the environment controllers 101 and 102 have the mesh client functionality 114 allowing them to exchange data with other devices over the mesh network 20. For instance, the environment controllers 101 and 102 can exchange data with each other over the mesh network 20. The environment controllers 101 and 102 can also respectively exchange data with a master environment controller 103 over the mesh network 20. As mentioned previously, the data exchanged over the mesh network 20 may consist of environmental data as well as Internet data.

Each of the environment controllers 101 and 102 have the Wi-Fi hotspot functionality 112 allowing them to respectively establish a Wi-Fi hotspot 10 and 11, and exchange data with other devices over respectively the Wi-Fi hotspots 10 and 11. For illustration purposes, the environment controller 101 exchanges Internet data with a user terminal 401 over the Wi-Fi hotspot 10 through its Wi-Fi hotspot functionality 112. The environment controller 101 also exchanges environmental data with a sensor 201 and a controlled appliance 202 over the Wi-Fi hotspot 10 through its Wi-Fi hotspot functionality 112. The environment controller 102 exchanges Internet data with a user terminal 402 over the Wi-Fi hotspot 11 through its Wi-Fi hotspot functionality 112. The environment controller 102 also exchanges environmental data with a controlled appliance 203 over the Wi-Fi hotspot 11 through its Wi-Fi hotspot functionality 112. Each of the user terminal 401, sensor 201 and controlled appliance 202 have a Wi-Fi client functionality for associating with the Wi-Fi hotspot 10 and exchanging data with the environment controller 101 over the Wi-Fi hotspot 10. Similarly, each of the user terminal 402 and controlled appliance 203 have a Wi-Fi client functionality for associating with the Wi-Fi hotspot 11 and exchanging data with the environment controller 102 over the Wi-Fi hotspot 11. The devices represented in FIG. 2 as associated with the Wi-Fi hotspots 10 and 11 are for illustration purposes. Any combination of user terminals, ECDs and other devices may be associated with the Wi-Fi hotspots 10 and 11.

The sensor 201 is a specific type of ECD capable of measuring an environmental characteristic with a sensing component, generating a corresponding environmental characteristic value, and transmitting the environmental characteristic value to an environment controller 101. The sensor 201 may (for illustration purposes only and without limitation) be capable of performing one of: a temperature measurement, a humidity measurement, an air pressure measurement, a voltage measurement, an apparatus on/off status determination, a carbon monoxide detection, a flood detection, an intrusion alarm, a fire alarm, etc.

The controlled appliance 202 is a specific type of ECD capable of receiving a command from an environment controller 101 and executing the command. The command is optionally pre-processed before being executed. The execution of the command generally actuates an actuator of the controlled appliance 202. The controlled appliance 202 may (for illustration purposes only and without limitation) consist of one of: a temperature thermostat, a ventilation system, an apparatus on/off switch, a surveillance camera, etc.

The master environment controller 103 has a mesh client functionality 114 for exchanging data with other ECDs (e.g. 101 and 102) over the mesh network 20.

In a particular embodiment, only the master environment controller 103 is connected (via a fixed network connection such as Ethernet or a wireless network connection such as Wi-Fi) to an Internet gateway 250, which provides access to the Internet 30. Thus, the master environment controller 103 is a relay for the Internet data exchanged between the user terminals (e.g. 401 and 402) and devices (not represented in FIG. 2) connected to the Internet 30.

For instance, uplink Internet data generated by the user terminal 401 are transmitted over the Wi-Fi hotspot 10 to the environment controller 101, received by the environment controller 101 via its Wi-Fi hotspot functionality 112 and transmitted over the mesh network 20 via its mesh client functionality 114, received by the master environment controller 103 via its mesh client functionality 114 and forwarded to the Internet gateway 250, for further transmission to the Internet 30. Downlink Internet data directed to the user terminal 401 are received by the Internet gateway 250 from the Internet 30 and forwarded to the master environment controller 103, received by the master environment controller 103 and transmitted over the mesh network 20 via its mesh client functionality 114, received by the environment controller 101 via its mesh client functionality 114 and transmitted over the Wi-Fi hotspot 10 via its Wi-Fi hotspot functionality 112, and received by the user terminal 401. The same applies for uplink and downlink Internet data of the user terminal 402, except that they transit via the environment controller 102 instead of the environment controller 101. Furthermore, due to the properties of communications over a mesh network, Internet data exchanged between the environment controller 101 and the master environment controller 103 may transit via the environment controller 102, and via any other device connected to the mesh network 20. The same applies for the Internet data exchanged between the environment controller 102 and the master environment controller 103, which may transit via the environment controller 101, and via any other device connected to the mesh network 20.

In another particular embodiment, the Internet gateway 250 has a mesh client functionality and is directly connected to the mesh network 20. Thus, Internet data can be exchanged directly between the environment controllers 101 and 102, and the Internet gateway 250, over the mesh network 20, without transiting through the master environment controller 103.

In still another particular embodiment, the master environment controller 103 corresponds to the ECD 100 represented in FIG. 1, and also has a Wi-Fi hotspot functionality 112. Thus, the master environment controller 103 can establish a Wi-Fi hotspot (not represented in FIG. 2), and exchange Internet data with user terminal(s) and/or environmental data with ECD(s) over the established Wi-Fi hotspot; in a similar manner as the environment controllers 101 and 102.

With respect to the environmental data, each of the environment controllers 101 and 102 may operate independently of the master environment controller 103, under the control of the master environment controller 103, or partially independently and partially under the control of the master environment controller 103.

For instance, the sensor 201 generates an environmental characteristic value based on an environmental characteristic measured by the sensor 201, and transmits it to the environment controller 101 over the Wi-Fi hotspot 10. The processing unit 120 of the environment controller 101 (not represented in FIG. 2 for simplification purposes) receives the environmental characteristic value from the sensor 201 via its Wi-Fi hotspot functionality 112. The processing unit 120 of the environment controller 101 determines an environmental state based on the environmental characteristic value, and generates a command based on the environmental state. The command is transmitted by the processing unit 120 of the environment controller 101 to the controlled appliance 202 over the Wi-Fi hotspot 10 via its Wi-Fi hotspot functionality 112.

Alternatively, the processing unit 120 of the environment controller 101 receives the environmental characteristic value from the sensor 201 via its Wi-Fi hotspot functionality 112, and forwards it to the master environment controller 103 over the mesh network 20 via its mesh client functionality 114. The processing unit 120 of the master environment controller 103 (not represented in FIG. 2 for simplification purposes) receives the environmental characteristic value from the environment controller 101 via its mesh client functionality 114. The processing unit 120 of the master environment controller 103 determines an environmental state based on the environmental characteristic value, and generates a command based on the environmental state. The command is transmitted by the processing unit 120 of the master environment controller 103 to the environment controller 101 over the mesh network 20 via its mesh network functionality 114. The processing unit 120 of the environment controller 101 receives the command from the master environment controller 103 via its mesh client functionality 114, and forwards the command to the controlled appliance 202 over the Wi-Fi hotspot 10 via its Wi-Fi hotspot functionality 112. The command may also be transmitted by the processing unit 120 of the master environment controller 103 to the environment controller 102 over the mesh network 20 via its mesh network functionality 114. The processing unit 120 of the environment controller 102 (not represented in FIG. 2 for simplification purposes) receives the command from the master environment controller 103 via its mesh client functionality 114, and forwards the command to the controlled appliance 203 over the Wi-Fi hotspot 11 via its Wi-Fi hotspot functionality 112.

For example, the sensor 201 is a motion detector which transmits an indication of a motion in a room to the environment controller 101, which forwards the indication to the master environment controller 103. The master environment controller 103 determines an occupancy of the room, and determines an appropriate temperature and/or humidity for the occupied room. The master environment controller 103 may generate a command to activate a heating/cooling device 202. The command is transmitted to the environment controller 101 and forwarded to the heating/cooling device 202. Alternatively or complementarily, the master environment controller 103 generates a command to activate a humidity regulation device 203. The command is transmitted to the environment controller 102 and forwarded to the humidity regulation device 203.

As mentioned previously, due to the properties of communications over a mesh network, environmental data exchanged between the environment controller 101 and the master environment controller 103 may transit via the environment controller 102, and via any other device connected to the mesh network 20. The same applies for the environmental data exchanged between the environment controller 102 and the master environment controller 103, which may transit via the environment controller 101, and via any other device connected to the mesh network 20.

As illustrated previously, several types of ECDs can exchange environmental data over the mesh network 20, and the Wi-Fi hotspots 10 and 11: environment controllers (e.g. 101, 102 and 103), sensors (e.g. 201), and controlled appliances (e.g. 202 and 203). However, the present environment control system is not limited to such a configuration, and other types of devices may exchange environmental data over the present communication infrastructure. Furthermore, although only sensors (e.g. 201) and controlled appliances (e.g. 202 and 203) have been represented in FIG. 2 as associating with the Wi-Fi hotspots 10 and 20 to exchange environmental data with the environment controllers 101 and 102, slave environment controllers may also associate with the Wi-Fi hotspots 10 and 20 to exchange environmental data with the environment controllers 101 and 102, implementing a three levels hierarchy of environment controllers.

The environmental characteristic value received by an environment controller (e.g. 101, 102 or 103) may be immediately processed upon reception by its processing unit 120, to generate a command. Alternatively, the environmental characteristic value is stored in its memory 130 (not represented in FIG. 2), and processed later by its processing unit 120 to generate the command. A command may also be generated based on several received environmental characteristic values.

An environment controller (e.g. 103) may be capable of receiving a plurality of environmental characteristic values from a plurality of ECDs (e.g. 101 and 102), determining a plurality of environmental states based on the plurality of environmental characteristic values, generating a plurality of commands based on the plurality of environmental states, and transmitting the plurality of commands to a plurality of ECDs (e.g. 101 and 102).

Figure 3:
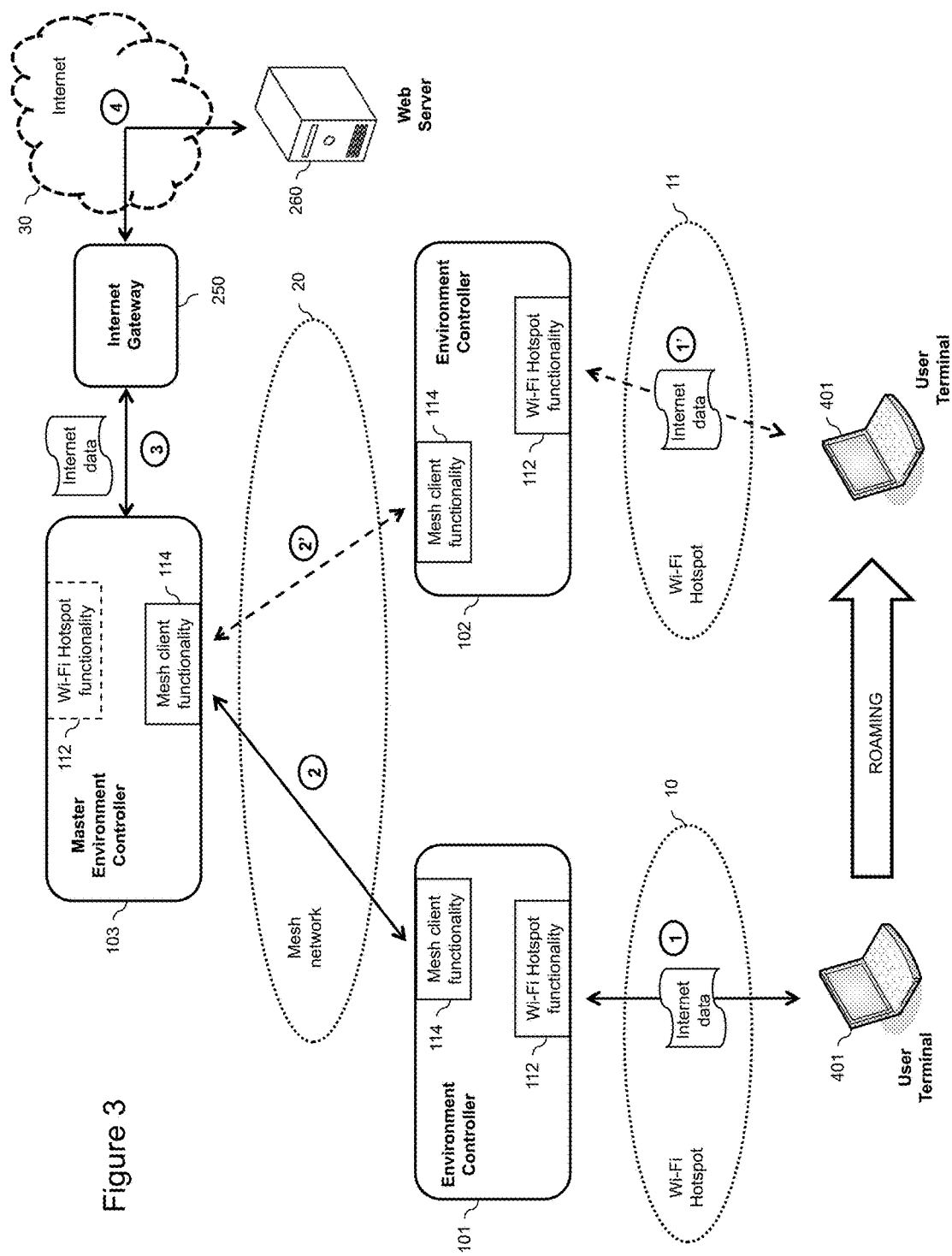
FIG. 3 illustrates the environment control system of FIG. 2 with ECDs providing a roaming functionality between Wi-Fi hotspots.

In a particular aspect, and referring now to FIG. 3, the Wi-Fi hotspot functionality 112 implements a roaming functionality for allowing a user terminal 401 to roam from a Wi-Fi hotspot 10 established by a first ECD 101 to another Wi-Fi hotspot 11 established by another ECD 102, the two ECDs 101 and 102 being connected to the mesh network 20.

For instance, as illustrated in FIG. 3, the user terminal 401 is exchanging Internet data with a web server 260 connected to the Internet 30, via a first communication path represented by reference numerals 1, 2, 3 and 4. The first communication path includes the Wi-Fi hotspot 10 and the mesh network 20, and the Internet data transit through the environment controller 101 and the master environment controller 103. Then, the user terminal 401 moves away from the environment controller 101 and gets closer to the environment controller 102, so that at some point, the Wi-Fi hotspot functionalities 112 of the environment controllers 102 and 101 respectively associate the user terminal 401 with the Wi-Fi hotspot 11 and de-associate it from the Wi-Fi hotspot 10. Then, the user terminal 401 exchanges the Internet data with the web server 260 via a second communication path represented by reference numerals 1', 2', 3 and 4. The second communication path includes the Wi-Fi hotspot 11 and the mesh network 20, and the Internet data transit through the environment controller 102 and the master environment controller 103.

The Wi-Fi hotspot functionalities 112 of the environment controllers 101 and 102 may implement a non-seamless roaming functionality, where the de-association of the user terminal 401 from the Wi-Fi hotspot 10 and the re-association of the user terminal 401 with the Wi-Fi hotspot 11 is not coordinated, so that Internet data may be lost during the roaming procedure Alternatively, the Wi-Fi hotspot functionalities 112 of the environment controllers 101 and 102 implement a seamless roaming functionality, where the de-association of the user terminal 401 from the Wi-Fi hotspot 10 and the re-association of the user terminal 401 with the Wi-Fi hotspot 11 is coordinated, so that no Internet data is lost during the roaming procedure. The seamless roaming functionality implies that control data are exchanged between the Wi-Fi hotspot functionalities 112 of the environment controllers 101 and 102 via the mesh network 20, to coordinate the roaming procedure and make it seamless. Implementing seamless roaming between Wi-Fi hotspots is a procedure well known in the art.

In another particular aspect, and referring back to FIG. 2, the Wi-Fi hotspot functionality 112 of the ECDs (e.g. 101 and 102) operates at a first frequency for exchanging the environmental data with other ECDs (e.g. 201, 202 and 203) over the Wi-Fi hotspots (e.g. 10 and 11); and the Wi-Fi hotspot functionality 112 operates at a second frequency for exchanging the Internet data with the user terminals (e.g. 401 and 402) over the Wi-Fi hotspots (e.g. 10 and 11).

Having a Wi-Fi hotspot operate at two different frequencies is a functionality well known in the art of 802.11 Access Points. This allows to isolate the environmental data transmitted over a Wi-Fi hotspot (e.g. 10) from the Internet data transmitted over the same Wi-Fi hotspot (e.g. 10). ECDs (e.g. 201 and 202) associate with the Wi-Fi hotspot (e.g. 10) using the first frequency; and user terminals (e.g. 401) associate with the Wi-Fi hotspot (e.g. 10) using the second frequency. Furthermore, the parameters (e.g. SSID, password, key, etc.) for associating with the Wi-Fi hotspot (e.g. 10) at the first frequency can be different from the parameters (e.g. SSID, password, key, etc.) for associating with the Wi-Fi hotspot (e.g. 10) at the second frequency. This prevents a user terminal 401 from gaining access to the environmental data transmitted over the Wi-Fi hotspot (e.g. 10) at the first frequency, which is dedicated to the environmental data.

In still another particular aspect, the environmental data exchanged between ECDs (e.g. 101, 201 and 202/102 and 203) over the Wi-Fi hotspot (e.g. 10 and 11) are encrypted via a dedicated encryption mechanism. This may be useful for instance when the Wi-Fi hotspots (e.g. 10 and 11) are not operating at two different frequencies as previously mentioned. In this case, the dedicated encryption mechanism prevents user terminals (e.g. 401 and 402) from gaining access to the environmental data transmitted over the Wi-Fi hotspots (e.g. 10 and 11). The same or another dedicated encryption mechanism may also be used for encrypting the environmental data exchanged between ECDs (e.g. 101, 102 and 03) over the mesh network 20.

Any encryption mechanism known in the art may be used. However, encryption software needs to be deployed on any ECD exchanging encrypted environmental data, including ECDs with potentially light processing capabilities, such as sensors (e.g. 201) and controlled appliances (e.g. 202 and 203). Thus, from an implementation perspective, a lightweight encryption mechanism may be preferred.

Environment Control Devices in Daisy-Chained Communication Configuration

A daisy-chained communication configuration is a chain of devices, where each device in the chain receives signals from a preceding device in the chain and transmits signals to a following device in the chain. Thus, a device of rank I in the chain only communicates signals directly with devices of ranks I−1 and I+1 in the chain, and cannot communicate signals directly with devices of ranks I−2, I+2, etc.

In the context of an environment control system, a plurality of daisy-chained ECDs communicate with each other for exchanging environmental data, control data, configuration data, etc. The data in the dais-chained communication configuration are transmitted from a source device (e.g. a master ECD) to a destination device (e.g. one of the daisy-chained ECDs) via a message comprising the environmental data and an identifier (e.g. an address) of the destination device through the daisy-chained ECDs 510,520,530 until it reaches the destined dais-chained ECD 540. When the destination device (in the present example ECD 540) receives the message, it determines that it is the recipient of the message based on the identifier (e.g. the address) in the message.

The signals transmitted along the daisy-chained communication configuration are used to configure the addresses of the daisy-chained ECDs, for allowing them to exchange the environmental data over the daisy-chain network.

Figure 4:
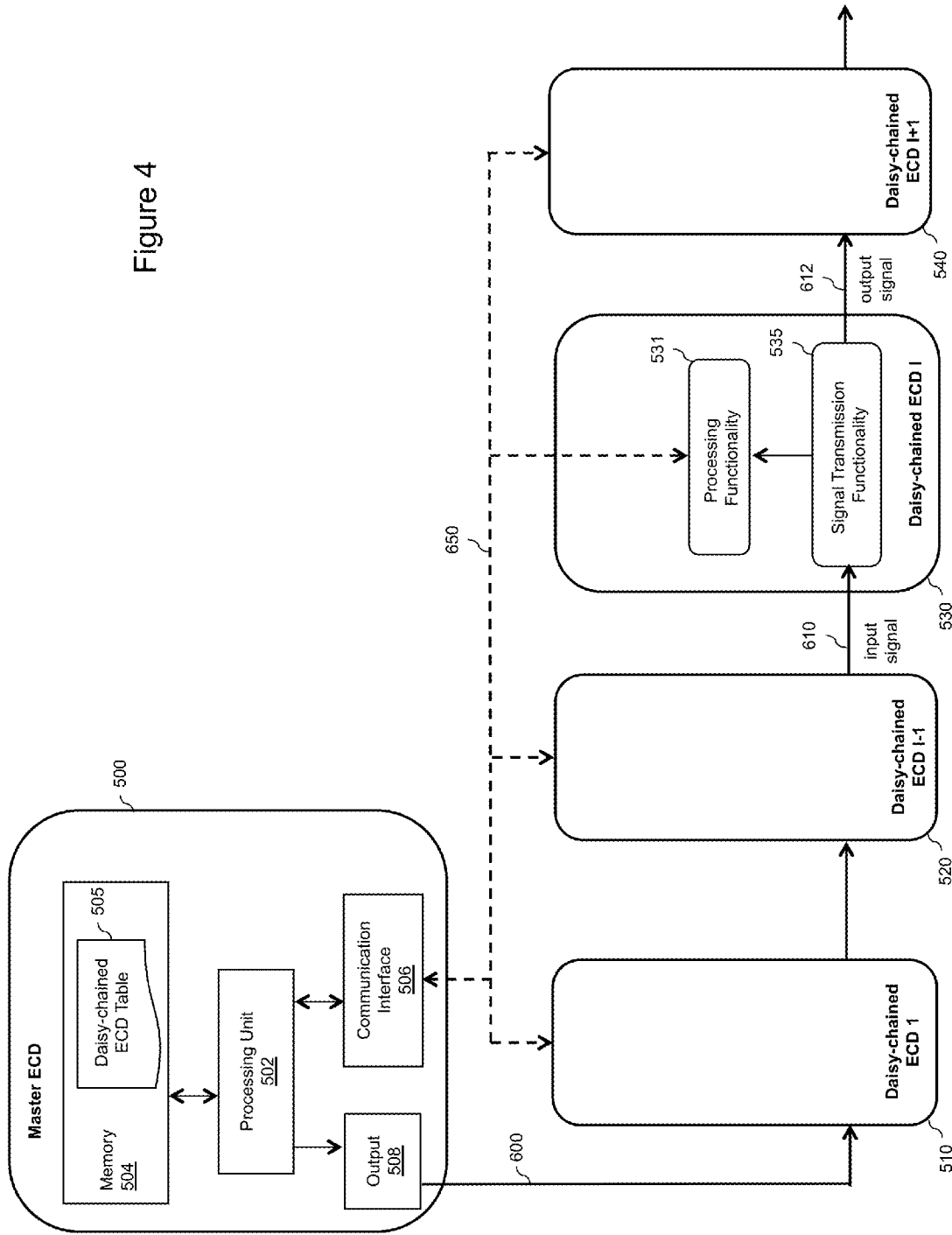
FIG. 4 illustrates a daisy-chained communication configuration comprising a master ECD and daisy-chained ECDs.
Figure 5:
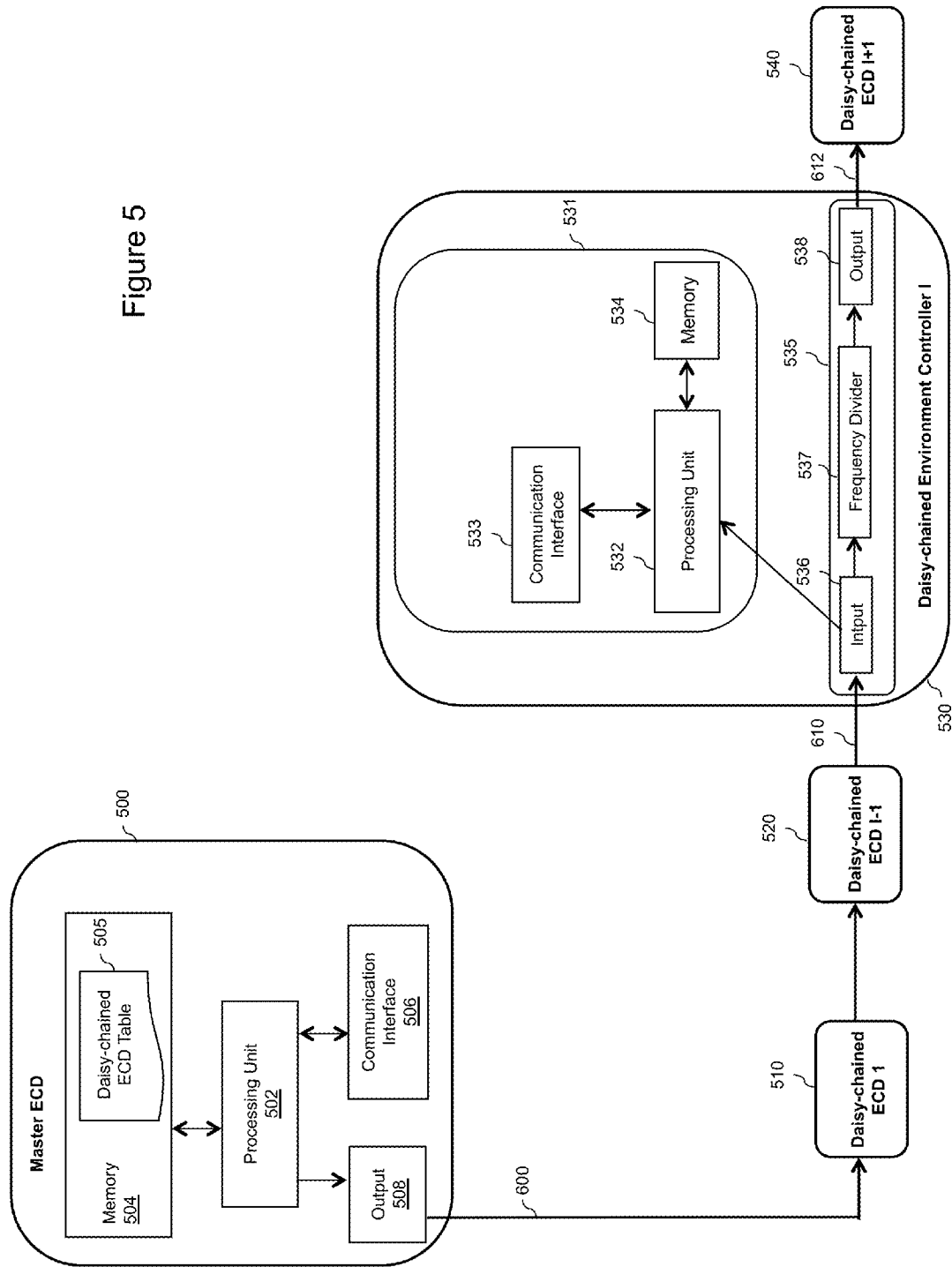
FIG. 5 illustrates details of one of the daisy-chained ECDs represented in FIG. 4.

Reference is now made concurrently to FIGS. 4 and 5, which represent a master ECD and a plurality of daisy-chained ECDs in a daisy-chained communication configuration. FIG. 5 illustrates details of one of the daisy-chained ECDs represented in FIG. 4.

The device 500 is the master ECD. The master ECD 500 comprises a processing unit 502, capable of executing instructions of a computer program for implementing the functionalities of the master ECD 500. The master ECD 500 also comprises memory 504 for storing instructions of the computer program, data generated by the execution of the computer program, data received via a communication interface 506, etc. Only a single memory 504 is represented in FIG. 4, but the master ECD 500 may comprise several types of memories, including volatile memory (such as a volatile Random Access Memory (RAM)), non-volatile memory (such as a hard drive), etc.

The master ECD 500 further comprises an output 508 for transmitting a signal 600 generated by the master ECD 500 to a first ECD 510 in daisy-chained communication configuration. The master ECD 500 may optionally comprise a communication interface 506 for exchanging control messages with ECDs (e.g. 510, 520, 530 and 540) in daisy-chained configuration over a communication bus 650.

The communication interface 650 may consist of one of the following: a serial link supporting the Modbus protocol for exchanging environmental data between the master ECD 500 and the ECDs (e.g. 510, 520, 530 and 540) in daisy-chained communication configuration, a cabled Ethernet network supporting the IP protocol stack, a common electronic bus supporting a dedicated communication protocol (when all the devices of the daisy-chained communication configuration are part of the same electronic chassis), a wireless communication infrastructure (e.g. a wireless mesh network), etc.

The master ECD 500 may comprise a user interface (e.g. a keyboard, mouse, touchscreen not represented in FIG. 4) and a display (not represented in FIG. 4) for allowing a user to interact with the master ECD 500.

The ECDs 510, 520, 530 and 540 are daisy-chained ECDs which receive an input signal, initially generated by the master ECD 500 (signal 600) and forwarded along the daisy-chained communication configuration. The daisy-chained communication configuration comprises a plurality (at least two) of ECDs, including the first ECD 510. ECDs 520, 530 and 540 represent three ECDs which follow one another and have the respective ranks I−1, I, and I+1 in the daisy-chained communication configuration. Internal components have been represented for the daisy-chained ECD 530 only (for simplification purposes), and the other daisy-chained ECDs (510, 520 and 540) have similar internal components. However, each of the daisy-chained ECDs (510, 520 and 540) may further have other components not shown herein for clarification purposes.

Each of the daisy-chained ECDs 510, 520, 530 and 540 comprises a processing functionality 531 and a signal transmission functionality 535. The processing functionality 531 may be implemented on a detachable electronic board, which can be easily removed and replaced without preventing the signal transmission functionality 535 to operate normally during the removal and replacement process.

The processing functionality 531 comprises a processing unit 532 (represented in FIG. 5), capable of executing instructions of a computer program for implementing the functionalities of the ECD 530. For instance, the processing unit 532 processes environmental data (e.g. a command) received from the master ECD 500 through a communication interface 533 (represented in FIG. 5), and/or generates environmental data (e.g. an environmental characteristic value) transmitted to the master ECD 500 through the communication interface 533.

The processing functionality 531 also comprises memory 534 (represented in FIG. 5) for storing instructions of the computer program, data generated by the execution of the computer program, etc. Only a single memory 534 is represented in FIG. 5, but the processing functionality 531 may comprise several types of memories, including volatile memory (such as a volatile Random Access Memory (RAM)), non-volatile memory (such as a hard drive), etc.

The processing functionality 531 further comprises the communication interface 533 for exchanging environmental data with the master ECD 500 (and/or with other ECDs 510, 520, 530 or 540 of the daisy-chained communication configuration) through the daisy-chained network, albeit the other ECD in daisy-chained configuration.

The signal transmission functionality 535 comprises an input 536 (represented in FIG. 5) for receiving an input signal 610, transmitted by the previous ECD 520 in the daisy-chained communication configuration, and an output 538 (represented in FIG. 5) for transmitting an output signal 612 to the following ECD 540 in the daisy-chained communication configuration.

A signal 600 generated by the master ECD 500 is transmitted to the first ECD 510 in the daisy-chained communication configuration, and propagated from ECD to ECD along the daisy-chained communication configuration (via the respective inputs 536 and outputs 538 of each ECD), until the recipient ECD in the daisy-chained communication configuration is reached. Furthermore, as will be detailed later in the description, the frequency of the propagated signal is modified by the signal transmission functionality 535 of each ECD in the daisy-chained communication configuration.

The infrastructure for propagating the signals along the daisy-chained communication configuration may consist of one of the following: a common electronic bus (when all the ECDs are part of the same electronic chassis), a point to point wired link between each consecutive devices, a point to point wireless link between each consecutive ECD, etc.

The daisy-chained ECDs 510, 520, 530 and 540 may comprise a user interface (e.g. a keyboard, mouse, touchscreen not represented in FIG. 5) and a display (not represented in FIG. 5) for allowing a user to interact with the daisy-chained ECD.

The master ECD 500 generates a signal 600 having a pre-determined base frequency $F_0$. The master ECD 500 comprises a clock source (not represented in FIG. 4) for generating the signal 600 at the base frequency $F_0$. The signal 600 may be very basic, since its sole purpose is to carry the base frequency $F_0$. For example, the signal 600 may consist of a square wave.

The master ECD 500 outputs the generated signal 600 to the first ECD 510 in the daisy-chained communication configuration, via its output 508.

Each of the daisy-chained ECDs 510, 520, 530 and 540 in the daisy-chained communication configuration consecutively receives an input signal. At the first daisy-chained ECD 510, the input signal 600 is received from the master ECD 500. At the second daisy-chained ECD, the input signal is received from the first daisy-chained ECD 510, and so on. The input signal is thus received from the previous ECD in the daisy-chained communication configuration. The input signal is propagated through the daisy-chained communication configuration until it reaches the recipient daisy-chained ECD or the last ECD in the daisy-chained communication configuration.

Each of the consecutive daisy-chained ECDs 510, 520, 530 and 540 is adapted for receiving an input signal with a different input frequency. The input signal is received via the input 536 of the daisy-chained devices 510, 520, 530 and 540.

Each of the daisy-chained ECDs 510, 520, 530 and 540 consecutively generates an output signal having a frequency different from the frequency of the input signal received. The signal transmission functionality 535 of each daisy-chained ECD 510, 520, 530 and 540 comprises a frequency divider 537 (represented in FIG. 5) for generating the output signal based on the received input signal, but having an output frequency different from the frequency of the received input signal. For example, the output signal may be generated by performing a division of frequency by half of the input signal. Frequency dividers consist of electronic circuits well known in the art. For example, the frequency divider may be implemented by an analogic binary counter. The input signal 610 received by a daisy-chained ECD of rank I in the daisy-chained communication configuration is used to generate an output signal 612 of frequency $F_I = F_0/I$. The output signal 612 outputted by the daisy-chained ECD of rank I in the daisy-chained communication configuration has the frequency $F_I = F_0/(I+1)$. Thus, if the base frequency $F_0$ is 40 kHz, the input frequencies of the received signals received by the daisy-chained ECDs of rank 1, 2 and I in the daisy-chained communication configuration are respectively 40 kHz, 20 kHz and 40/I kHz, while the output frequencies of the outputted signals outputted by the daisy-chained ECDs of rank 1, 2 and I in the daisy-chained communication configuration are respectively 20 kHz, 10 kHz and 40/(I+1).

Alternatively, the output frequency $F_{I+1}$ of the output signal 612 may be generated by incrementing or decrementing the input frequency $F_I$ of the input signal 610 by a pre-determined value $\Delta$. The signal transmission functionality 535 comprises another specialized electronic circuit in place of the frequency divider 537, capable of generating the output signal 612 based on the input signal 610 by performing an increment or decrement of frequency by a pre-determined value. The input signal 610 received by the daisy-chained ECD of rank I in the daisy-chained communication configuration has the input frequency $F_I = F_0 + (I-1)*\Delta$ or $F_I = F_0 - (I-1)*\Delta$. The output signal 612 outputted by the daisy-chained ECD of rank I in the daisy-chained communication configuration has the output frequency $F_I = F_0 + I*\Delta$ or $F_I = F_0 - I*\Delta$. For example, if the base frequency $F_0$ is 40 kHz and the pre-determined increment value $\Delta$ is 20 kHz, the input frequencies of the signals received by the ECDs of rank 1, 2 and I in the daisy-chained communication configuration are respectively 40 kHz, 60 kHz and 40+20*(I-1) kHz. A person skilled in the art may design other algorithms (implementable via a specialized electronic circuit in the signal transmission functionality 535) for generating an output signal 612 having an output frequency $F_I$ based on the pre-determined base frequency $F_O$ and a position I of the ECD in the daisy-chained communication configuration.

In both previous examples (frequency divider or pre-determined increment/decrement), the output frequency of the signal 612 generated by the current ECD 530 is based on the pre-determined base frequency $F_O$ of the master ECD 500, and the position I of the ECD in the daisy-chained communication configuration.

The output 538 of the daisy-chained ECD 530 of rank I in the daisy-chained communication configuration outputs the output signal 612 to the following device 540 of rank I+1 in the daisy-chained communication configuration.

The daisy-chained ECD 530 of rank I in the daisy-chained communication configuration also determines an address of the ECD 530 based on the frequency $F_I$ of the received input signal 610.

An electronic circuit (not represented in FIG. 5) of the signal transmission functionality 535 may extract the input frequency $F_I$ of the input signal 610 received via the input 536, and transmit the input frequency $F_I$ to the processing unit 532. Alternatively, the received input signal 610 may be transmitted by the input 536 to an electronic circuit (not represented in FIG. 5) of the processing functionality 531, which extracts the input frequency $F_I$ of the input signal 610 and transmits the input frequency $F_I$ to the processing unit 532.

In a particular aspect, an address lookup table (not represented in FIG. 5) is stored in the memory 534. The address lookup table comprises a plurality of addresses and corresponding frequencies. The address lookup table shall be interpreted in a broad sense, as any data structure capable of storing a plurality of addresses and corresponding frequencies. The address of each daisy-chained ECD 510, 520, 530 and 540 is determined by its processing unit 532 via the address lookup table, by identifying the address corresponding to the input frequency $F_I$ of the input signal 510 in the address lookup table.

The address lookup table may be transferred by an operator in the memory 534 from an Universal Serial Bus (USB) key or portable hard drive (if the ECD 530 comprises an USB interface), from a computing device such as a tablet or a laptop via an Bluetooth or Near Field Communication (NFC) interface (if the ECD 530 comprises an Bluetooth or NFC interface), etc. Alternatively, the address lookup table is initially transferred in the memory 504 of the master ECD 500 by an operator via one of USB, Bluetooth, NFC, etc. means. The address lookup table can then be transmitted via the communication interface 506 of the master ECD 500 on the communication interface 650 in a broadcast message. The broadcast message is received by all the daisy-chained ECDs (e.g. 510, 520, 530 and 540) of the daisy-chained communication configuration via their communication interface 533. The address lookup table is extracted from the broadcast message by the processing unit 532 and stored in the memory 534. The communication interface 533 of the daisy-chained ECDs does not need to have an address configured to be capable of receiving the broadcast message.

In another particular aspect, the address of each of the daisy-chained ECDs 510, 520, 530 and 540 may be generated by its processing unit 532 based on the input frequency $F_I$ of the input signal. For instance, if the address is an IP address, the input frequency $F_I$ can be used for generating the part of the address that is not a prefix (the interface ID). This is particularly true in the case of IPv6, where a large number of bits is allocated to the interface ID part of the address, allowing for directly using the value of the input frequency $F_I$ in the interface ID part of the address.

The address determined by the processing unit 532 is the address of the communication interface 533 used for exchanging environmental data with the master ECD 500 (and/or with other daisy-chained ECDs). Once the address is determined, the processing unit 532 configures the communication interface 533 with the determined address. The configuration of a communication interface with an address is out of the scope of the present disclosure, since it is well known in the art. It is dependent on the type of the communication interface 650 (e.g. serial bus, cabled Ethernet network, wireless network, etc.), and the type of communication protocols used for exchanging environmental data over the communication interface 650 (e.g. Modbus, IP protocol stack, etc.).

Once the communication interface 533 of each daisy-chained ECDs in the daisy-chained communication configuration is configured with the determined address, one of the daisy-chained ECDs (for example 530) and the master ECD 500 can exchange environmental data over the communication interface 650. The master ECD 500 can send environmental data (e.g. a command) to the daisy-chained ECD 530, by using its configured address as the destination address. The master ECD 500 can receive environmental data (e.g. an environmental characteristic value) from the daisy-chained ECD 530 and identify the daisy-chained ECD 530 as being the sender, by identifying its configured address as being the source address.

The memory 504 of the master ECD 500 stores for each daisy-chained ECD (e.g. 530) of the daisy-chained communication configuration the address of the daisy-chained ECD (e.g. 530), and characteristics of the daisy-chained ECD (e.g. 530). For example, as illustrated in FIG. 4, the memory 504 stores a daisy-chained ECD table 305, comprising for each entry in the table the address and characteristics of one of the daisy-chained ECDs (e.g. 510, 520, 530 and 540). The daisy-chained ECD table 505 shall be interpreted in a broad sense, as any data structure capable of storing a plurality of addresses and corresponding ECD characteristics.

The data generated by the processing unit 502 of the master ECD 500 for transmission to a particular one of the daisy-chained ECDs (e.g. 530) of the daisy chain communication (via the communication interface 506) depends on the particular characteristics of the particular daisy-chained ECD stored in the memory 504 (e.g. in the daisy-chained ECD table 505). Similarly, the processing applied by the processing unit 502 to data received (via the communication interface 506) from a particular ECD (e.g. 530) of the daisy-chained communication configuration depends on the particular characteristics of the particular ECD stored in the memory 504 (e.g. in the daisy-chained ECD table 505).

The characteristics comprise a type of the particular daisy-chained ECD. For example, the type of the particular ECD may be an environment controller, a sensor or a controlled device. The characteristics may also comprise a sub-type of the ECD. In the case of a sensor, the sub-type can be a temperature measurement sensor, a humidity measurement sensor, an air pressure measurement sensor, a voltage measurement sensor, etc. In the case of a controlled appliance, the sub-type can be a temperature thermostat, a ventilation system, an apparatus on/off switch. For example, the processing applied by the processing unit 502 to environmental characteristic values received from a temperature measurement sensor is different from the processing applied to environmental characteristic values received from a voltage measurement sensor. Similarly, a command generated by the processing unit 502 for transmission to a temperature thermostat is different from a command generated for transmission to a ventilation system. In the case where the particular ECD is an environment controller, the characteristics may also comprise a list of devices (e.g. sensors and/or controlled appliances) under its control, along with characteristics of each device under its control. The characteristics may further comprise configuration parameters of the ECDs (e.g. a range of temperatures for a temperature thermostat, a range of speeds for a ventilation system, etc.).

The characteristics may also include a logical name of the particular daisy-chained ECD. The logical name of an ECD can for example combine a function of the ECD and a location of the ECD. In the context of an environment control system where the daisy-chained ECDs are environment controllers, examples of logical names are: controller_room_1, controller_room_2, etc. When the daisy-chained ECDs are controlled appliances, examples of logical names are: thermostat_room_1, thermostat_room_2, camera_main_door, etc. The advantage of using logical names (over for example a MAC address or a serial number of the ECD) is that they remain constant over time, even if the ECD needs to be replaced by a new ECD with the same function.

The daisy-chained ECD table 505 may be transferred by an operator in the memory 504 from an Universal Serial Bus (USB) key or portable hard drive (if the master ECD 500 comprises an USB interface), from a computing device such as a tablet or a laptop via an Bluetooth or Near Field Communication (NFC) interface (if the master ECD 500 comprises an Bluetooth or NFC interface), etc.

Alternatively, the characteristics of one or several of the daisy-chained ECDs (e.g. 530) of the daisy-chained communication configuration may be directly transmitted by the daisy-chained ECD (via its communication interface 533) over the communication interface 650 to the master ECD 500. The characteristics are received by the master ECD 500 via its communication interface 506, processed by its processing unit 502 (match the received characteristics to the corresponding address of the daisy-chained ECD), and stored in its memory 504 (e.g. in the daisy-chained ECD table 505). In this case, if an ECD is added in the daisy-chained communication configuration, or replaced by another ECD, no operator intervention is required for updating the master ECD 500, since the new ECD automatically transmits its characteristics to the master ECD 500.

In the configuration represented in FIG. 5, the master ECD 500 consists of a master environment controller and the daisy-chained ECDs (e.g. 510, 520, 530 and 540) consist of environment controllers. In an alternative configuration (not represented in the Figures), the master ECD 500 may consist of an environment controller and the daisy-chained ECDs (e.g. 510, 520, 530 and 540) may consist of a combination of sensors and controlled appliances. In still an alternative configuration (not represented in the Figures), the master ECD 500 may consist of a master environment controller and the daisy-chained ECDs (e.g. 510, 520, 530 and 540) may consist of a combination of environment controllers, sensors, and controlled appliances.

Daisy-Chained Environment Control Devices with a Wi-Fi Hotspot Functionality

Figure 6:
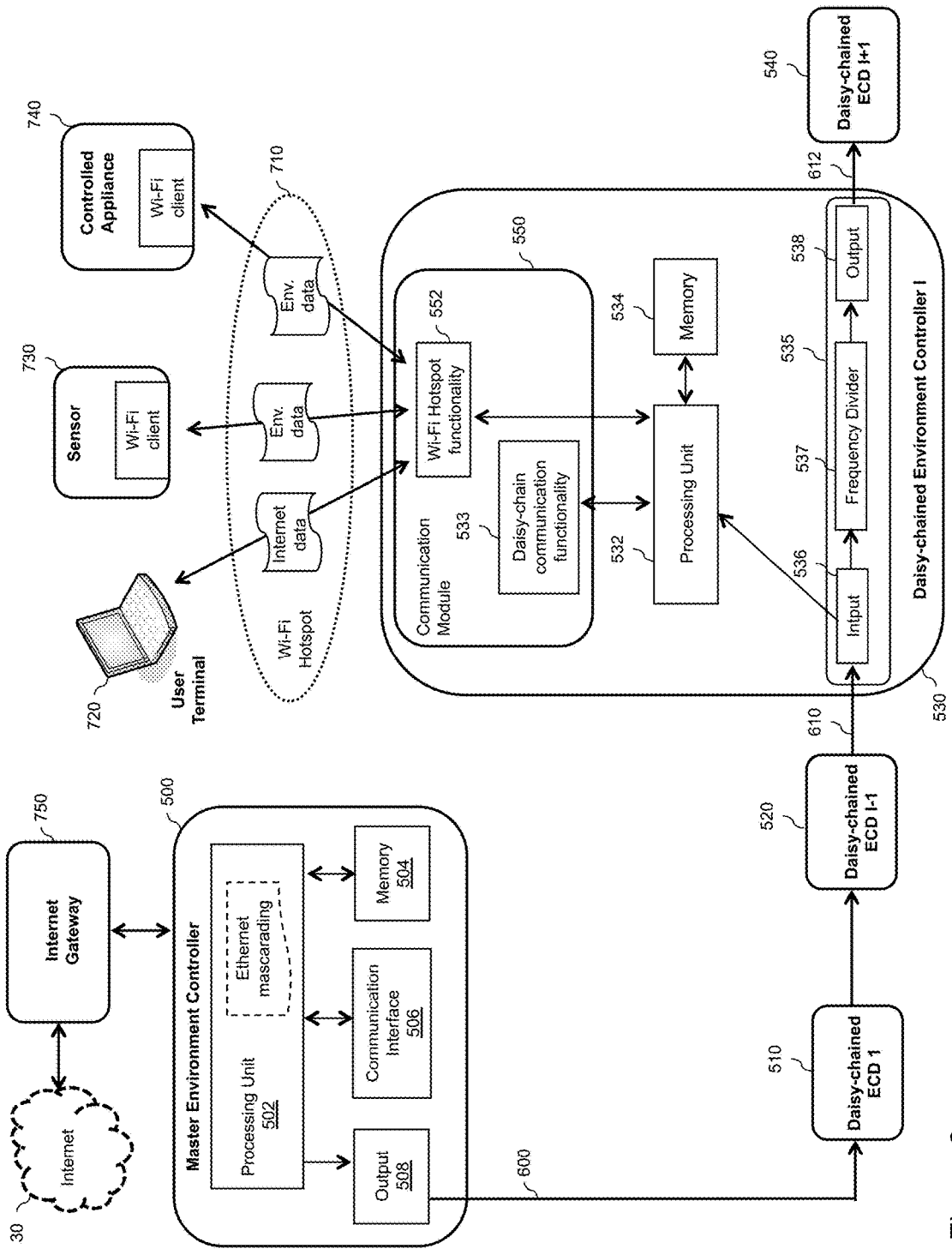
FIG. 6 illustrates one of the daisy-chained ECDs represented in FIG. 4 further implementing a Wi-Fi hotspot functionality.

Reference is now made to FIG. 6, which represents one of the daisy-chained ECDs represented in FIGS. 4 and 5 further having a Wi-Fi hotspot functionality.

For illustration purposes, the daisy-chained ECD 530 represented in FIGS. 4 and 5 is represented with an additional Wi-Fi hotspot functionality 552. However, any number of daisy-chained ECDs of the daisy-chained communication configuration represented in FIGS. 4 and 5 may have the additional Wi-Fi hotspot functionality 552. Furthermore, since the additional Wi-Fi hotspot functionality 552 is used to exchange environmental data with other ECDs (such as sensors and/or controlled appliances), the daisy-chained ECD 530 with the additional Wi-Fi hotspot functionality 552 is an environment controller.

The daisy-chained ECD 530 comprises a communication module 550. The communication module 550 comprises the Wi-Fi hotspot functionality 552 and a daisy-chain communication functionality 533. The daisy-chain communication functionality 533 corresponds to the communication interface 533 represented in FIGS. 4 and 5.

The Wi-Fi hotspot functionality 552 allows the daisy-chained ECD 530 to establish a Wi-Fi hotspot 710. The Wi-Fi hotspot functionality 552 further allows the daisy-chained ECD 530 to exchange environmental data (e.g. information, commands, etc.) with at least one other ECD (e.g. a sensor 730 and/or a controlled appliance 740) over the Wi-Fi hotspot 710, as well as to exchange Internet data with at least one user terminal 720 over the Wi-Fi hotspot 710. The daisy-chain communication functionality 533 allows the daisy-chained ECD 530 to exchange environmental data with at least one other ECD (e.g. the master environment controller 500) over the communication interface 650, as well as to exchange Internet data with at least one other ECD (e.g. the master environment controller 500) over the communication interface 650. The environmental data and the Internet data may be exchanged with the same ECD (e.g. the master environment controller 500), or with different ECDs (e.g. the master environment controller 500 and another daisy-chained ECD), over the communication interface 650.

Thus, the communication module 550 of the daisy-chained ECD 530 provides the standard capability of exchanging environmental data with at least another ECD (e.g. sensor 730, controlled appliance 740 or master environment controller 500), over the Wi-Fi hotspot 710 and/or the communication interface 650. The daisy-chained ECD 530 has the additional capability of providing Internet access for user terminal(s) 720 connected to the Wi-Fi hotspot 710. For this purpose, the communication module 550 receives upstream Internet data from a user terminal 720 over the Wi-Fi hotspot 710 and forwards the upstream Internet data to another ECD (e.g. master environment controller 500) over the communication interface 650. The communication module 550 also receives downstream Internet data from another ECD (e.g. master environment controller 500) over the communication interface 650 and forwards the downstream Internet data to the user terminal 720 over the Wi-Fi hotspot 710. Although a single user terminal 720 is represented in FIG. 6 for simplification purposes, the Wi-Fi hotspot 710 may provide Internet access to a plurality of user terminals 720.

The communication module 550 of the daisy-chained ECD 530 corresponds to the communication module 110 of the ECD 100 represented in FIG. 1. The Wi-Fi hotspot functionality 552 of the daisy-chained ECD 530 corresponds to the Wi-Fi hotspot functionality 112 of the ECD 100 represented in FIG. 1. The daisy-chain communication functionality 533 of the daisy-chained ECD 530 corresponds to the mesh client functionality 114 of the ECD 100 represented in FIG. 1. In a particular aspect, the communication interface 650 is a mesh network and the daisy-chain communication functionality 533 is a mesh client functionality similar to the mesh client functionality 114 of the ECD 100 represented in FIG. 1.

In a particular embodiment, the master environment controller 500 is connected (via a fixed network connection such as Ethernet or a wireless network connection such as Wi-Fi) to an Internet gateway 750, which provides access to the Internet 30. Thus, the master environment controller 500 is a relay for the Internet data exchanged between the user terminals (e.g. 720) and devices (not represented in FIG. 6) connected to the Internet 30.

For instance, uplink Internet data generated by the user terminal 720 are transmitted over the Wi-Fi hotspot 710 to the daisy-chained environment controller 530, received by the daisy-chained environment controller 530 via its Wi-Fi hotspot functionality 522 and transmitted over the communication interface 650 via its daisy-chain communication functionality 533, received by the master environment controller 500 via its communication interface 506 and forwarded to the Internet gateway 750, for further transmission to the Internet 30. Downlink Internet data directed to the user terminal 720 are received by the Internet gateway 750 from the Internet 30 and forwarded to the master environment controller 500, received by the master environment controller 500 and transmitted over the communication interface 650 via its communication interface 506, received by the daisy-chained environment controller 530 via its daisy-chain communication functionality 533 and transmitted over the Wi-Fi hotspot 710 via its Wi-Fi hotspot functionality 552, and received by the user terminal 720.

In another particular embodiment, the Internet gateway 750 may be directly connected to the communication interface 650. Thus, Internet data can be exchanged directly between the daisy-chained environment controller 530 and the Internet gateway 750, over the communication interface 650, without transiting through the master environment controller 500.

In still another particular embodiment, the master environment controller 500 also has a Wi-Fi hotspot functionality 552. Thus, the master environment controller 500 can establish a Wi-Fi hotspot (not represented in FIG. 6), and exchange Internet data with user terminal(s) and/or environmental data with ECD(s) over the established Wi-Fi hotspot; in a similar manner as the daisy-chained environment controller 530.

With respect to the environmental data, the daisy-chained environment controller 530 may operate independently of the master environment controller 500, under the control of the master environment controller 500, or partially independently and partially under the control of the master environment controller 500.

For instance, the sensor 730 generates an environmental characteristic value based on an environmental characteristic measured by the sensor 730, and transmits it to the daisy-chained environment controller 530 over the Wi-Fi hotspot 710. The processing unit 532 of the daisy-chained environment controller 530 receives the environmental characteristic value from the sensor 730 via the Wi-Fi hotspot functionality 552. The processing unit 532 determines an environmental state based on the environmental characteristic value, and generates a command based on the environmental state. The command is transmitted by the processing unit 532 to the controlled appliance 740 over the Wi-Fi hotspot 710 via the Wi-Fi hotspot functionality 522.

Alternatively, the processing unit 532 receives the environmental characteristic value from the sensor 730 via the Wi-Fi hotspot functionality 552, and forwards it to the master environment controller 500 over the communication interface 650 via the daisy-chain communication functionality 533. The processing unit 502 of the master environment controller 500 receives the environmental characteristic value from the daisy-chained environment controller 530 via its communication interface 506. The processing unit 502 determines an environmental state based on the environmental characteristic value, and generates a command based on the environmental state. The command is transmitted by the processing unit 502 to the daisy-chained environment controller 530 over the communication interface 650 via the communication interface 506. The processing unit 532 of the daisy-chained environment controller 530 receives the command from the master environment controller 500 via the daisy-chain communication functionality 533, and forwards the command to the controlled appliance 740 over the Wi-Fi hotspot 710 the Wi-Fi hotspot functionality 552.

As mentioned previously with respect to the ECD 100 represented in FIG. 1, in a particular aspect, the Wi-Fi hotspot functionality 552 implements a roaming functionality for allowing a user terminal (e.g. 720) to roam from a Wi-Fi hotspot (e.g. 710) established by a first daisy-chained ECD (e.g. 530) to another Wi-Fi hotspot (not represented in FIG. 6) established by another daisy-chained ECD (e.g. 520 or 540), the two ECDs being connected to the communication interface 650.

The Wi-Fi hotspot functionality 552 may implement a non-seamless roaming functionality, where the de-association of the user terminal from the first Wi-Fi hotspot and the re-association of the user terminal with the second Wi-Fi hotspot 11 is not coordinated, so that Internet data may be lost during the roaming procedure. Alternatively, the Wi-Fi hotspot functionality 552 implements a seamless roaming functionality, where the de-association of the user terminal from the first Wi-Fi hotspot and the re-association of the user terminal with the second Wi-Fi hotspot 11 is coordinated, so that no Internet data is lost during the roaming procedure.

As mentioned previously with respect to the ECD 100 represented in FIG. 1, in another particular aspect, the Wi-Fi hotspot functionality 552 operates at a first frequency for exchanging the environmental data with other ECDs (e.g. sensor 730 and controlled appliance 740) over the Wi-Fi hotspot (e.g. 710); and the Wi-Fi hotspot functionality 552 operates at a second frequency for exchanging the Internet data with the user terminals (e.g. 720) over the Wi-Fi hotspot (e.g. 710). Furthermore, the parameters (e.g. SSID, password, key, etc.) for associating with the Wi-Fi hotspot (e.g. 710) at the first frequency can be different from the parameters (e.g. SSID, password, key, etc.) for associating with the Wi-Fi hotspot (e.g. 710) at the second frequency. This prevents a user terminal (e.g. 720) from gaining access to the environmental data transmitted over the Wi-Fi hotspot (e.g. 710) at the first frequency, which is dedicated to the environmental data.

As mentioned previously with respect to the ECD 100 represented in FIG. 1, in still another particular aspect, the environmental data exchanged between ECDs (e.g. sensor 730 and controlled appliance 740) over the Wi-Fi hotspot (e.g. 710) are encrypted via a dedicated encryption mechanism. This may be useful for instance when the Wi-Fi hotspot (e.g. 710) is not operating at two different frequencies as previously mentioned. In this case, the dedicated encryption mechanism prevents user terminals (e.g. 720) from gaining access to the environmental data transmitted over the Wi-Fi hotspot (e.g. 710). The same or another dedicated encryption mechanism may also be used for encrypting the environmental data exchanged between ECDs (e.g. master environment controller 500 and daisy-chained environment controller 530) over the communication interface 650.

In yet another particular aspect, the processing unit 502 of the master ECD 500 implements an Ethernet masquerading functionality (represented in FIG. 6) for the Internet data exchanged between the ECDs (e.g. 530) of the daisy-chained communication configuration and the Internet gateway 750.

For instance, an upstream Internet data packet generated by the user terminal 720 has the Media Access Control (MAC) address of the user terminal 720, and an IP address allocated to the user terminal 720. The upstream Internet data packet is transmitted to the master ECD 500 by the daisy-chained ECD 530, as previously described. The processing unit 502 of the master ECD 500 replaces the MAC address of the of the user terminal 720 with its own MAC address, before forwarding the upstream Internet data packet to the Internet gateway 750, for further transmission over the Internet 30.

The master ECD 500 stores in its memory 504 a mapping table (not represented in FIG. 6 for simplification purposes) between the MAC addresses and the IP addresses of all the user terminals (e.g. 720) currently exchanging Internet data with the Internet, via their respected daisy-chained ECD (e.g. 530).

When the processing unit 502 of the master ECD 500 receives a downstream Internet data packet from the Internet 30 via the Internet gateway 750, it checks the destination IP address of the downstream Internet data packet. If the destination IP address is the IP address of the master ECD 500, the downstream Internet data packet is processed locally by the processing unit 502 of the master ECD 500. If the destination IP address is not the IP address of the master ECD 500, the processing unit 502 replaces its own MAC address in the downstream Internet data packet with the destination MAC address of the destination user terminal (e.g. 720). For this purpose, the processing unit 502 uses the mapping table stored in its memory 504 to find the destination MAC address corresponding to the destination IP address. Then, the downstream Internet data packet is forwarded to the proper daisy-chained ECD (e.g. 530) providing the Wi-Fi hotspot functionality 552 to the destination user terminal (e.g. 720), and finally transmitted to the destination user terminal (e.g. 720) over the Wi-Fi hotspot 710.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. An environment control device (ECD) comprising:
   an input for receiving an input signal having an input frequency from a preceding device in a daisy-chained communication configuration;
   an electronic circuit for generating an output signal having an output frequency different and based on the input frequency;
   an output for outputting the output signal to a following device in the daisy-chained communication configuration; and
   a processing unit for determining a communication address of the ECD based on the input frequency of the input signal; and
   a communication module comprising:
   a first communication functionality for communicating over a first network using the communication address; and
   a second communication functionality consisting of a Institute of Electrical and Electronics Engineers (IEEE) 802.11 hotspot functionality for establishing a second network consisting of a IEEE 802.11 hotspot at the ECD;
   the communication module providing for receiving upstream Internet data from at least one user terminal over the IEEE 802.11 hotspot and forwarding the upstream Internet data to another device over the first network, and the communication module providing for receiving downstream Internet data from the other device over the first network and forwarding the downstream Internet data to the at least one user terminal over the IEEE 802.11 hotspot.

2. The ECD of claim 1, wherein the first communication functionality is a mesh client functionality and the first network is a mesh network.

3. The ECD of claim 1, wherein the processing unit provides for:
   receiving an environmental characteristic value from a sensor over the IEEE 802.11 hotspot via the IEEE 802.11 hotspot functionality, determining an environmental state based on the environmental characteristic value, generating a command based on the environmental state, and transmitting the command to a controlled appliance over the IEEE 802.11 hotspot via the IEEE 802.11 hotspot functionality.

4. The ECD of claim 1, wherein the processing unit provides for:
   receiving an environmental characteristic value from a sensor over the IEEE 802.11 hotspot via the IEEE 802.11 hotspot functionality, and forwarding the environmental characteristic value to another ECD over the first network via the first communication functionality.

5. The ECD of claim 1, wherein the processing unit provides for:
   receiving a command from another ECD over the first network via the first communication functionality, and forwarding the command to a controlled appliance over the IEEE 802.11 hotspot via the IEEE 802.11 hotspot functionality.

6. The ECD of claim 1, wherein the IEEE 802.11 hotspot functionality implements a roaming functionality for allowing the at least one user terminal to roam from the IEEE 802.11 hotspot to another IEEE 802.11 hotspot established by another ECD connected to the first network.

7. The ECD of claim 1, wherein the communication module further provides for exchanging environmental data with at least another ECD over the first network.

8. The ECD of claim 1, wherein the communication module further provides for exchanging environmental data with at least another ECD over the IEEE 802.11 hotspot.

9. The ECD of claim 8, wherein the IEEE 802.11 hotspot functionality operates at a first frequency for exchanging the environmental data with the at least another ECD over the IEEE 802.11 hotspot, and the IEEE 802.11 hotspot functionality operates at a second frequency for exchanging the Internet data with the at least one user terminal over the IEEE 802.11 hotspot.

10. The ECD of claim 8, wherein the environmental data exchanged with the at least another ECD over the IEEE 802.11 hotspot are encrypted via a dedicated encryption mechanism.

11. A master device for use in a daisy-chained communication configuration, the daisy-chained communication configuration comprising daisy-chained devices, the master device comprising:

memory for storing for each daisy-chained device of the daisy-chained communication configuration an address of the daisy-chained device and characteristics of the daisy-chained device;

an output for transmitting a signal having a pre-determined frequency to a first daisy-chained device in the daisy-chained communication configuration;

a communication interface for exchanging Internet data with the daisy-chained devices using the addresses of the daisy-chained devices stored in the memory, an exchange of Internet data between the master device and any one of the daisy-chained devices occurring directly between the master device and the any one of the daisy-chained devices without transiting through any other one of the daisy-chained devices; and a processing unit for:
  forwarding upstream Internet data received from the daisy-chained devices via the communication interface to an Internet gateway, and
  forwarding downstream Internet data received from the Internet gateway to the daisy-chained devices via the communication interface.

12. The master device of claim 11, wherein the processing unit implements an Ethernet masquerading functionality for the Internet data exchanged between the daisy-chained devices and the Internet gateway.

13. The master device of claim 11, wherein the communication interface further provides for exchanging environmental data with the daisy-chained devices using the addresses of the daisy-chained devices stored in the memory, an exchange of environmental data between the master device and any one of the daisy-chained devices occurring directly between the master device and the any one of the daisy-chained devices without transiting through any other one of the daisy-chained devices.

14. The master device of claim 13, wherein the processing unit generates environmental data transmitted to the daisy-chained devices via the communication interface, the generation of the environmental data depending on the characteristics of the daisy-chained devices stored in the memory, and the processing unit processes environmental data received from the daisy-chained devices via the communication interface, the processing of the environmental data depending on the characteristics of the daisy-chained devices stored in the memory.

* * * * *